Figure 15:
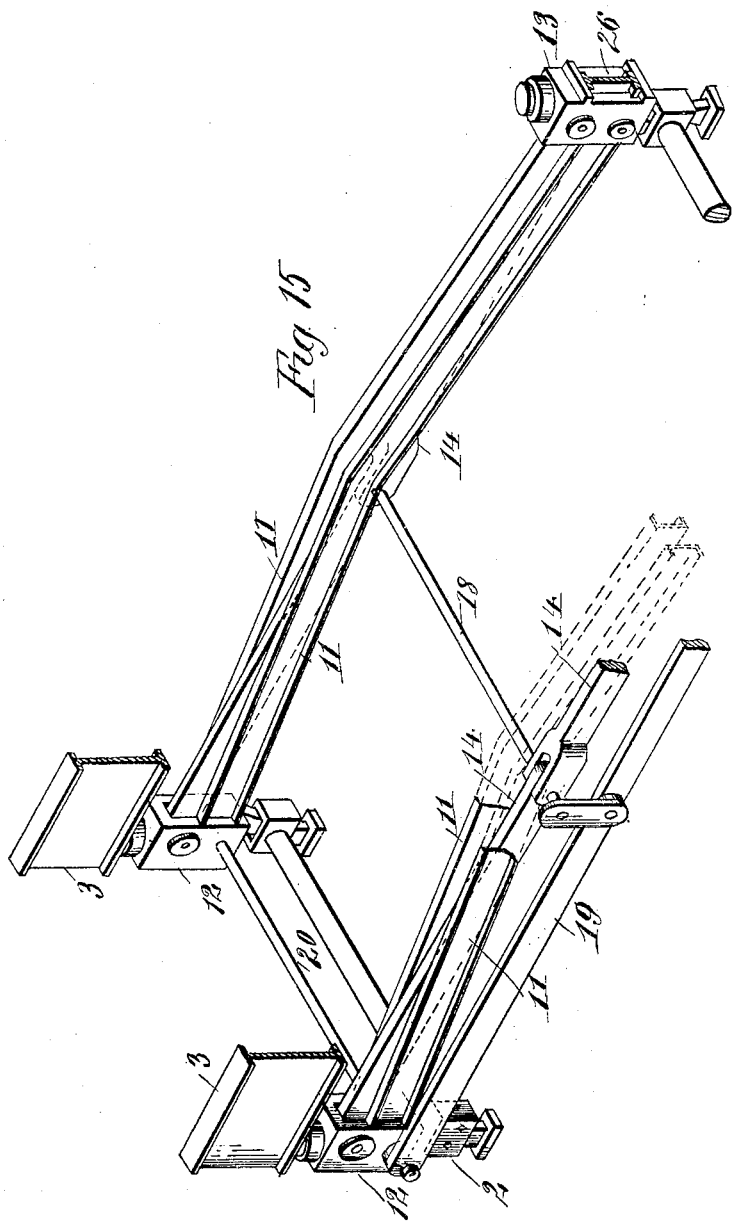

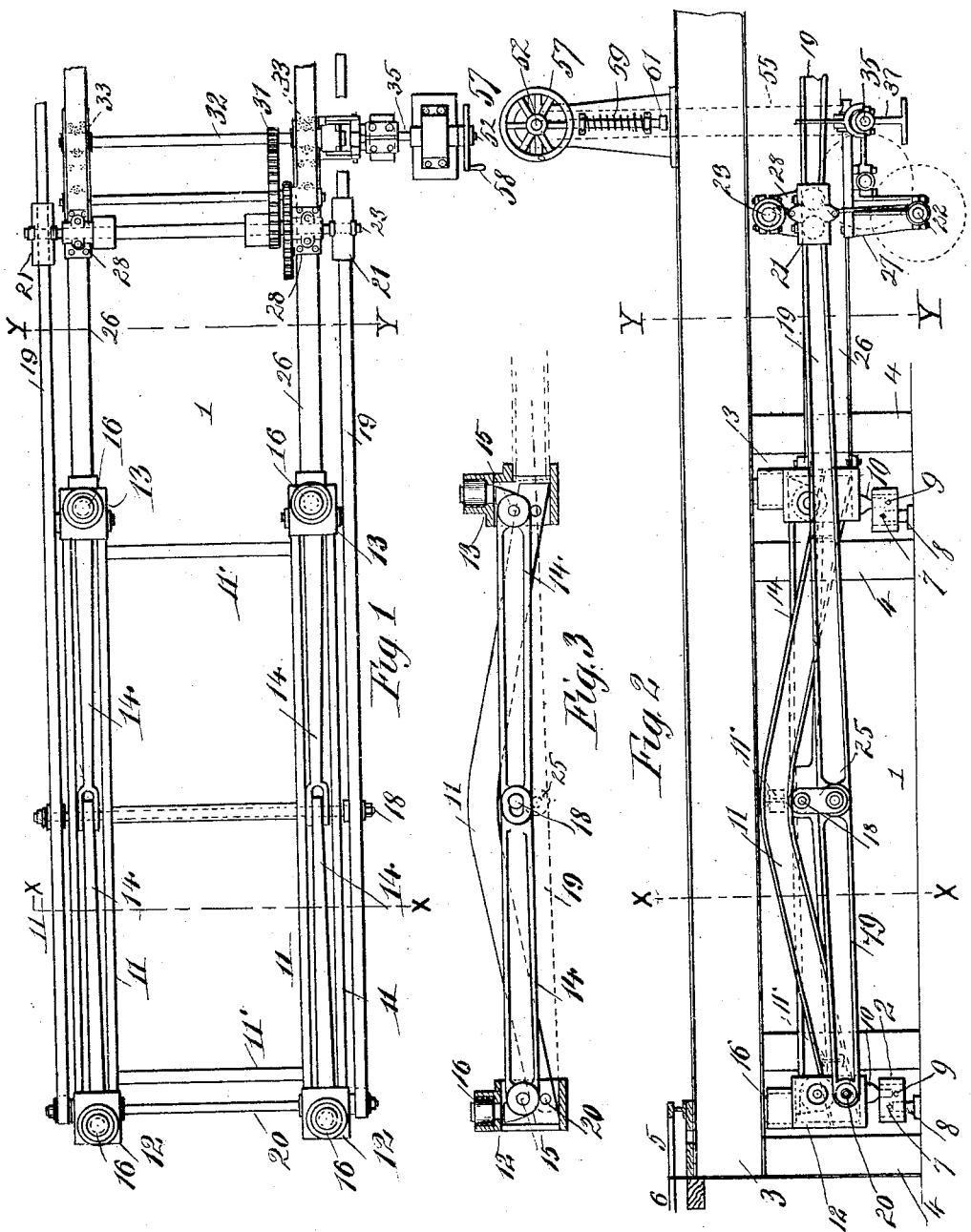

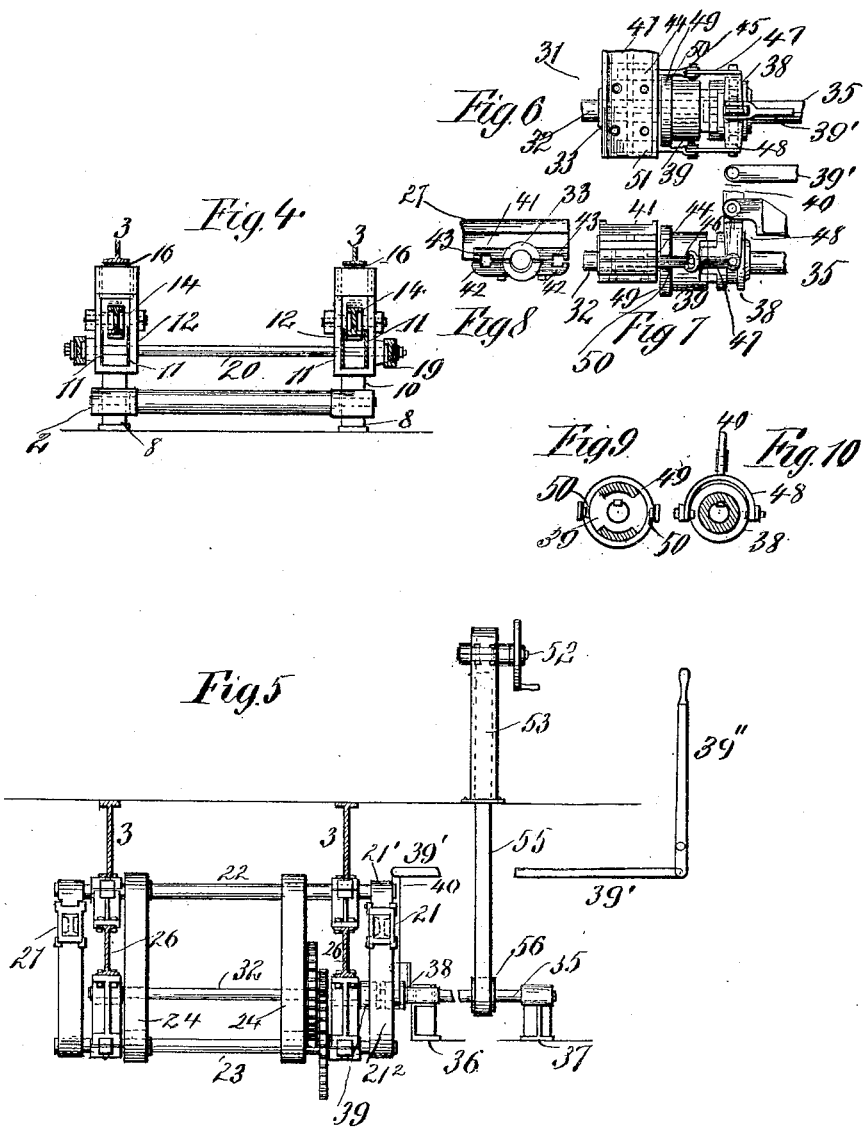

H. M. B. BARY.
VERTICAL LOADER FOR WEIGHING SCALES.
APPLICATION FILED DEC. 8, 1911. RENEWED JUNE 11, 1914.
1,104,401.
Patented July 21, 1914.
4 SHEETS—SHEET 3.
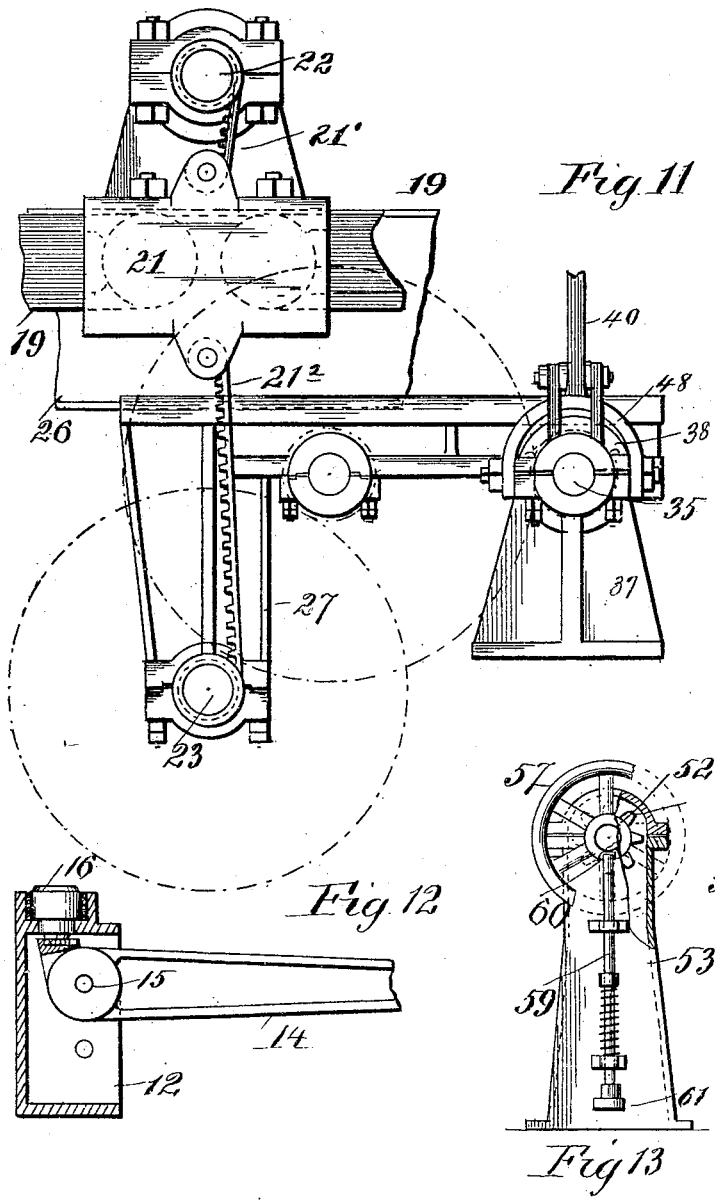
WITNESSES
INVENTOR H. M. B. BARY.
VERTICAL LOADER FOR WEIGHING SCALES.
APPLICATION FILED DEC. 8, 1911. RENEWED JUNE 11, 1914.

1,104,401.

Patented July 21, 1914.
4 SHEETS—SHEET 4.

WITNESSES

INVENTOR
Henry M. B. Bary
by Connally Bros
Attorneys

UNITED STATES PATENT OFFICE.

HENRY M. B. BARY, OF PHILADELPHIA, PENNSYLVANIA.

VERTICAL LOADER FOR WEIGHING-SCALES.

1,104,401. Specification of Letters Patent. Patented July 21, 1914.

Application filed December 8, 1911, Serial No. 664,694. Renewed June 11, 1914. Serial No. 844,585.

*To all whom it may concern:*

Be it known that I, HENRY M. B. BARY, a citizen of the United States, residing at Philadelphia, in the county of Philadelphia and State of Pennsylvania, have invented certain new and useful Improvements in Vertical Loaders for Weighing-Scales, of which the following is a specification, reference being had therein to the accompanying drawing.

This invention has relation to platform weighing scales, and especially to railroad track scales, and other platform scales of large capacity, and has for its object the provision of means for effecting an absolute vertical loading, or movement of the platform on to and away from its knife edge supports which are attached to the weighing levers, in order to eliminate undue use of and wear on the knife edge bearings of non-vertical loading railway track scales and permit trains to run over the scale platforms without dead rail arrangement.

The vertical loading means embodying my invention constitute a complete, self-contained portable system or apparatus and may be built with and as a constituent part of platform scales or applied to scales already built, since their application and use does not contemplate or require any change in the weighing mechanism of the standard scale.

The mechanism embodying my invention is designed, proportioned and adapted to be located between the weighing levers of the usual type and a weighing platform which, when not in weighing requisition rests on independent supports and any ordinary type of railroad track scales may be considered as the scale to which reference will be made hereafter in describing and claiming my improvement.

My invention consists in the novel construction and combination of devices hereinafter described and claimed.

In the accompanying drawing illustrating my invention as constructed in detail and as applied to a suitable platform scale: Figure 1 is a plan view of the vertical loader. Fig. 2 is a side elevation of the same, applied to a platform scale. Fig. 3 is a vertical longitudinal sectional view of a pair of lifting levers and housings in which the same are pivoted. Fig. 4 is a vertical transverse section of the loader on the line X—X of Figs. 1 and 2. Fig. 5 is a vertical transverse section of the loader on the line Y—Y of Figs. 1 and 2. Fig. 6 is a plan view of a clutch mechanism. Fig. 7 is a side view of the clutch mechanism. Fig. 8 is an end view of a detail of the clutch mechanism. Figs. 9 and 10 are transverse sectional views of the clutch mechanism. Fig. 11 is a side view, enlarged, of part of the mechanism for operating the lifting levers. Fig. 12 is a vertical sectional view of one of the housings in which the ends of the lifting levers are mounted. Fig. 13 is a front elevation, partly in section, of the manually operable shaft and mountings, through which motion is given to the clutch shaft. Fig. 14 is a side elevation of the same. Fig. 15 is a perspective view illustrating part of the platform lifting mechanism.

In applying my vertical loading means to platform scales of standard type, the pit 1, in which the weighing levers are located, is deepened so that the weighing levers 2, will be sufficiently below the platform to accommodate the vertical loading appliance between them and the platform.

3 designates the weighing platform, and 4 the independent supports upon which the platform rests when not in weighing requisition. When the platform is resting on these supports its track rails 5, are in alinement and on a level with the track rails 6, of the permanent roadway. The weighing levers 2, are fulcrumed on knife edges 7, supported by standards 8, and are provided with knife edges 9, upon which are supported the contact blocks 10. The platform 3, which, in ordinary scales, is provided with contact blocks resting on the contact blocks 10, of the weighing levers is not, according to my present plan, at any time in direct contact with the contact blocks 10, the vertical loading appliances of my invention being interposed between the contact blocks 10 and the platform and forming a connection between them.

The vertical loader embodying my invention comprises two self-contained portable frames, which are placed on the knife edge load bearings of the weighing levers of the outside sections of the scale. The sides of each of these frames comprise four flanged metal beams 11, 11, two on each side of the scale, placed far enough apart to permit free movement of the lifting levers between them, and all are braced by cross irons 11'. The ends of these beams are housed in suitable iron boxes 12, 13, whose solid bases rest on the contact blocks 10, which rest on the knife edge load bearings 9, of the weighing levers 2. The boxes 12, 13, are provided with suitable slots 12' to receive the lifting levers 14, which are supported by pins 15, passing laterally through the sides of the boxes, these pins serving as fulcrums for the lifting levers. The tops of the boxes are provided with suitable openings serving as housings within which plungers 16, supported by the ends of the short arms of the lifting levers, can be raised or lowered.

Each side frame of the loader is provided with four levers 14, of equal dimensions, each fulcrumed in a box at a corner of the frame. These levers are coupled in pairs in the center of the frame by a common shaft 18, to the ends of which are linked long levers 19, which are fulcrumed to the outside of the boxes 12, by means of cross shafts 20, passing from one box to the other on the opposite side. The long levers 19 of one constituent frame are coupled to the long levers 19 of the other similar frame, through suitable boxes 21, in the center of the scale. The boxes 21 are attached each by flexible racks 21'—21² to two cross shafts 22—23 respectively, placed one above the other in the center of the scale. These cross shafts are coupled together at each end by an endless chain 24, so that by the motion of either of the shafts 22—23, the boxes 21 will be raised or lowered accordingly as the chains 21'—21² are wound or unwound, and consequently the long levers 19, connected to the boxes 21, will in turn raise or lower simultaneously the eight levers 14—14 by means of the links 25, connecting the levers 19 with the shafts 18 that couple the short levers 14, in the center of each frame. The function of the levers 14 is to raise or lower the plungers 16 in the boxes 12—13, so as to lift the platform from its independent supports for weighing purposes and to replace it upon its independent supports for bringing the scale out of commission. These levers are so fulcrumed, that by the movement of their shaft ends the plungers 16, which are actuated by the load bearing points of the levers, are brought into and out of operative contact with the platform.

The frames containing levers 14 are connected to each other by two I beams 26, each I beam 26, being attached to the walls of the two boxes 13, 13, which are placed in the inside corners of each frame, so that the sides of the frames form a continuous line. From the bottom of the I beams 26 are suspended hangers 27, one on each side of the scale, and on the top of said beams are mounted shaft bearing standards 28. These hangers and standards support respectively the bearings of the two cross shafts 22—23, through which are raised and lowered, the two boxes 21 in which are jointly housed the free ends of the four long levers 19, and they also support the compound gearing for bringing the elevating mechanism of the platform into operation.

To eliminate any outside pressure upon any part of the platform elevating mechanism, so that it cannot interfere with the accuracy of the weighing mechanism, the primary operating pinion 31 of the gearing which is keyed to a transverse shaft 32, having its bearings in boxes 33, of the hangers 27, is operated from an outside shaft 35, by means of a clutch. The shaft 35 is supported by independent standards 36, 37. This clutch is so constructed that it automatically locks and unlocks the shaft 32, when the sliding member 38 of the clutch is brought into or out of operative engagement with the clutch member 39 keyed to the shaft 32 of said wheel 31. The sliding clutch member 38 is operated by a lever 39″ which rises above the scale platform and is coupled by a link bar 39' to the forked clutch lever 40. The operation of both the wheel and the clutch can be performed from any point outside the scale, the preferable point would be alongside the scale beam.

The automatic locking mechanism of the clutch is constructed and operated as follows: The members of the clutch are of the usual interlocking toothed kind. The hanger 27, has near one end, a bearing 41, for the shaft 32, and this bearing is composed of two half boxes, the ears 42, of which are formed with rectangular grooves, forming rectangular passages or slide ways 43, for the reception of horizontal rods 44, having their forward ends formed with forked heads 45, provided with elongated openings 46, to which are pivotally coupled the links 47, pivotally connected to the ends of the fork 48 of the clutch lever 40, so that when the sliding clutch member 38 is moved, the rods 44 will also move or slide within the slide ways 43.

The flange 49 of the non-sliding clutch member 39 is notched on diametrically opposite sides, as shown at 50, and the rods 44 are of such thickness by being widened at 51, a short distance back of their forked ends, that when the clutch members are wholly or partially out of full engagement with each other, the rods 44 will enter the notches 50 and interlock with the clutch member 39, thus locking the clutch member 39 always at the same position, so that the sliding clutch member 38' will meet and engage with it at a definite position of the latter. It is to be understood that the box 21 is to be limited and controlled in its movements up or down, so as to properly control and restrict the movements of the lifting levers. Movement is imparted to the boxes 21 through and from the primary shaft 32—35 when the clutch members are in engagement, while the shaft 35 receives its rotary motion from a manually operable shaft 52 mounted in a standard 53, above the weighing platform, and carrying a sprocket wheel 54, which by means of a chain 55 transmits motion to a sprocket wheel 56, mounted on the outside shaft 35. The shaft 52 is operated manually by means of a balanced hand wheel 57 with operating handle 58. As the movement from shaft 52 to shaft 32 is made through the clutch, two distinct operations are required in operating the lifting levers, viz., a movement of the clutch operating lever 39 and an independent rotation of the shaft 52. To lock and unlock the shaft 52, a spring controlled dog 59 is mounted on the side of the standard 53, and a notch 60 is formed in the hub or collar of the hand wheel 57 into which the end of the dog flies when the wheel and shaft have been turned until stopped. A foot piece 61 is attached to the lower end of the dog, so that by the pressure of the foot of the operator, the dog may be disengaged from the shaft and hand wheel when the latter are to be operated.

Now it is to be understood that the position of the teeth of the sliding clutch member is always the same relatively to the position of the notch 60 and hence when the shaft 52 has been turned a sufficient number of times and the dog then allowed to arrest its backward movement, the sliding clutch member will be in an exact position for engagement with the other member.

Assuming the dog is in engagement with the shaft 52, and the clutch members disengaged, the first movement is to operate the clutch lever and bring the clutch members into engagement. The dog is now withdrawn and the shaft 52, turned until it stops and the dog is allowed to engage the shaft 52 and lock it. Rotary movement is thus imparted to the shaft 35, and through it to the other parts of the lifting lever gearing to move these parts, to raise the weighing platform. To lower the platform, the reverse operation is performed.

This vertical loader is applicable to any type of existing non-vertical loading railway track scale, if their platforms be provided with independent supports and made rigid and their weighing levers lowered into the pit to permit the placing of the frames of the vertical loader between the weighing levers and the platform.

Any railway track scale equipped with this vertical loader is at all times out of commission excepting when the weighing takes place, so that cars can be run on or off the platform without any possibility of injuring the weighing mechanism. When the car is standing on the platform ready to be weighed, the lever controlling the clutch shaft of the operating wheel in the pit, is shifted and the hand wheel 57 is turned until it stops, then this lever is reversed and locks the gearing and disengages the clutch from the shaft, when the weight is ascertained in the usual way on the scale beam.

The principal advantageous, effective features of this vertical loader are as follows: 1. Any non-vertical loading railway track scale equipped with the vertical loader is at all times out of commission, with its rails on a level with those of the railroad, excepting when the actual weighing takes place, the load being imposed vertically on the knife edge bearings, free from any jars. 2. Undue wear of and injury to the knife-edge bearings of the weighing levers are eliminated, thus preserving the accuracy of the weighing mechanism. 3. Trains can run over the scale platform without dead rail arrangement when the scale is out of commission.

I claim:

1. A vertical loader for platform weighing scales, comprising a frame adapted to be arranged between the platform and the weighing levers, and to be supported solely by the latter, vertically movable plungers mounted on said frame, over the knife edges of the weighing levers and below the platform, a system of levers and connections through which all said plungers are operated simultaneously and means whereby all the plungers may be operated from a single point.

2. A vertical loader for platform weighing scales, comprising a self-contained frame composed of side beams, transverse connection, and platform elevating mechanism mounted on said frame, said loader adapted to be placed over and sustained solely by the weighing levers.

3. A vertical loader for platform scales, having platforms adapted, when not in use, to rest on supports independently of the weighing levers, said loader, comprising vertically adjustable jacks, and frames supporting the same, located between the platform and weighing levers and supported by the knife edges of the weighing levers, levers connected to the plungers of a plurality of jacks and coupled together between the jacks, levers connected to the frames adjacent the fulcrums of weighing levers, and linked to the levers of the jacks, a train of gearing and operating means having flexible connections and coupled to the last named levers and adapted to move the same, and to thereby operate the plungers of the jacks and raise the platform from its independent supports.

4. In a vertical loader for platform weighing scales, the combination of a platform, weighing levers located below the platform, supports adapted to sustain the platform independently of the weighing levers and with a self-contained, vertical loading mechanism comprising a frame sustained by said weighing levers, lifting levers carried by said frame, plungers actuated by said lifting levers and adapted to contact with the platform and mechanism for simultaneously operating all the lifting levers from a single point.

5. In a vertical loader for platform weighing scales, the combination of a platform, weighing levers located below the platform, supports adapted to sustain the platform independently of the weighing levers, with a self-contained, vertical loading mechanism comprising a frame sustained by said weighing levers, lifting levers carried by said frame, plungers actuated by said lifting levers and adapted to contact with the platform and mechanism for simultaneously operating all the lifting levers from a single point, said mechanism comprising a train of gearing including flexible connections, a divided shaft in one section of which is keyed a pinion and a non-sliding clutch member, and on the other section a sliding clutch member adapted to engage with the non-sliding member, clutch adjusting means, automatically operating means for locking the non-sliding clutch member, when the clutch members are disengaged, a winch, a flexible connection from the winch shaft to the shaft on which the sliding clutch member is mounted, and a dog adapted to lock the winch shaft at a point coinciding with a predetermined position of the non-sliding clutch member.

In testimony whereof I affix my signature in presence of two witnesses.

HENRY M. B. BARY.

Witnesses:
 HELENA S. HAINES,
 THOS. J. HUNT.

---

Copies of this patent may be obtained for five cents each, by addressing the "Commissioner of Patents, Washington, D. C."